INVENTOR.
IVAN F. WEEKS
BY William R. Lane
ATTORNEY

Feb. 25, 1958     I. F. WEEKS     2,824,971
NEUTRON DETECTOR

Filed May 16, 1955     2 Sheets-Sheet 2

INVENTOR.
IVAN F. WEEKS
BY
*William R. Lane*
ATTORNEY

# United States Patent Office 2,824,971
Patented Feb. 25, 1958

2,824,971

NEUTRON DETECTOR

Ivan F. Weeks, Livermore, Calif., assignor, by mesne assignments, to the United States of America as represented by the United States Atomic Energy Commission Application May 16, 1955, Serial No. 508,366

8 Claims. (Cl. 250—83.1)

This invention relates to neutron detectors and particularly to a detector sensitive to changes in a neutron flux.

Neutrons are relatively difficult to detect because they do not directly ionize a gas subjected thereto. Previous neutron detectors have usually utilized the secondary emission from an intermediate material, such as boron-10. When the boron-10 nuclide was bombarded with neutrons, particularly those in the thermal energy range, the neutrons were absorbed by the boron atoms. This resulted in an emission of an ionizing radiation from the boron after it absorbed the neutron. A conventional counting volume was then utilized to measure this secondary radiation. Alternatively, a counting chamber was utilized in conjunction with a liner or coating of a material, such as paraffin, from which fast neutrons knocked charged particles into the counting chamber. Such counting volumes necessarily required a high voltage power supply to furnish the necessary electrostatic field between the electrodes to collect the ions. Further, these counting volumes were very sensitive to spurious gamma radiations which are frequently associated with the neutron flux to be measured. In practice, it was very difficult to separate the counts resulting from the spurious gamma radiations from those resulting from the secondary emission of the neutron target.

It is frequently desirable to measure the rate of change of a neutron flux produced by a source of neutrons, such as a liquid homogeneous or water boiler reactor, in order to provide an additional safety device useful in rapidly detecting the start of a reactor runaway. In the past this was done by differentiating the output of the various neutron detectors. However, because of the sensitivity of such detectors to spurious sources of radiations, the differentiating network has to be made insensitive to minor fluctuations in the measured neutron flux. The device contemplated by this invention is unique in that since it is insensitive to any spurious gamma or beta radiations, it can be made very sensitive to very small changes in the neutron flux.

It is therefore an object of this invention to provide an improved neutron detector which is insensitive to spurious gamma radiations.

It is another object of this invention to provide a neutron detector which utilizes the heat generated by the absorption of neutrons by a substance and means for measuring said generated heat.

It is a further object of this invention to provide a neutron detector comprising a sealed chamber containing a gas, a substance in said chamber characterized by having a good neutron absorption cross-section; and means responsive to the pressure in said chamber for producing a signal output.

It is another object of this invention to provide a neutron-sensitive apparatus sensitive to the rate of change of a neutron flux comprising a pair of gas-filled sealed chambers; a restrictive orifice interconnecting said pair of chambers; pressure sensitive means responsive to the pressure differential between said sealed chambers; and a mass of fissionable material having a high surface area per unit volume positioned in one of said chambers.

Other objects of the invention will become apparent from the following description taken in connection with the accompanying drawings, in which—

Figure 1:
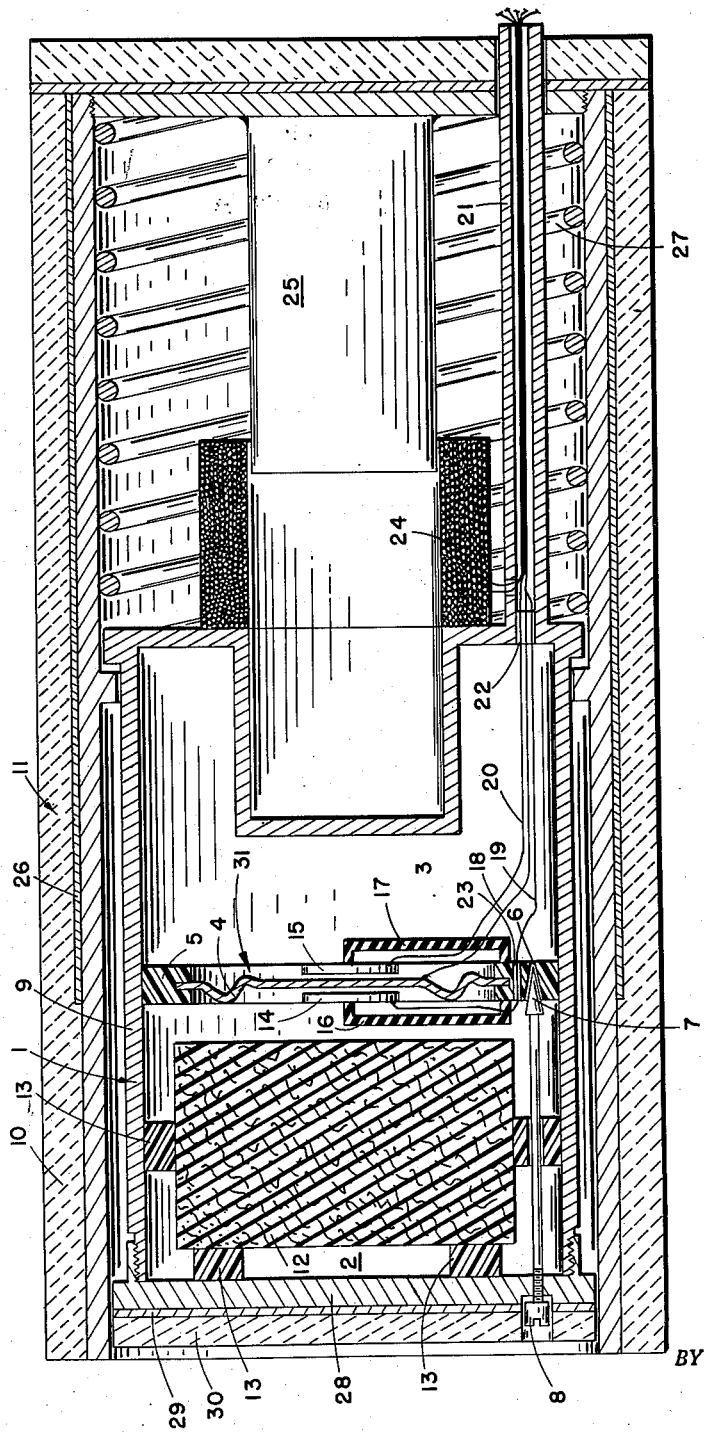
Fig. 1 is a sectioned drawing, partly schematic, of a preferred embodiment of the neutron detector contemplated by this invention.
Figure 3:
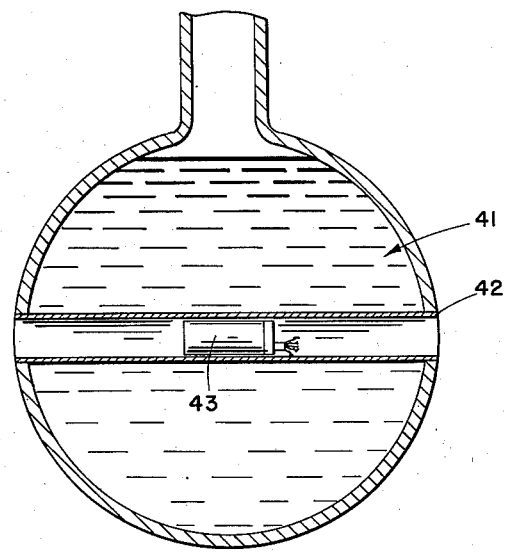

And Fig. 3 is a sectioned drawing of the core of a liquid homogeneous reactor utilizing the detector of Fig. 1 to measure changes in the neutron flux.

Referring now to Fig. 1, a preferred embodiment of an apparatus which originates heat as a result of neutron bombardment and which provides means for measuring the generated heat is shown. Casing 1 encloses sealed cylindrical chambers 2 and 3. Casing 1 is preferably constructed of a material which is a good heat conductor, such as aluminum, in order to insure that the gases in chambers 2 and 3 are normally subjected to substantially the same ambient temperature. Thus, any change in the ambient temperature does not result in any pressure differential between chambers 2 and 3 since the pressure in each changes the same amount. Chambers 2 and 3 are filled with a gas, preferably an inert gas, such as helium or argon, initially substantially at atmospheric pressure. The chambers are separated by flexible diaphragm 4 constructed of electrical conductive material, such as copper, which is supported by support 5 of an insulating material. Duct 6 in support 5 interconnects chambers 2 and 3. The size of duct 6 is made adjustable by means of tapered plunger 7 which controls the rate at which gases are permitted to flow between chambers 2 and 3 in response to a given pressure differential. The position of plunger 7 is adjusted by turning screw 8.

The radial walls 9 of casing 1 are constructed of thin aluminum which permits substantially free passage of neutrons from the outside into chamber 2. Since the gases in chambers 2 and 3 are usually maintained in the vicinity of atmospheric pressure, wall 9 is not subjected to undue stresses. Since the neutrons to be measured, particularly in the core of a liquid homogeneous reactor, as shown in Fig. 3, usually have mixed energy levels of slow, intermediate and fast, and since most materials having a good neutron absorbing cross-section are much more sensitive to thermal neutrons than to fast or intermediate neutrons, layer 10 of shutter 11 (to be described later) is constructed of a good moderating material and is interposed around the outside of wall 9. This layer thermalizes a large portion of the incident neutrons before they enter chamber 2. Layer 11 is preferably a layer of graphite which effectively slows down the fast and intermediate neutrons without materially absorbing any of the neutrons. Inside chamber 2 there is positioned mass 12 containing a large amount of a material having a good neutron absorption cross-section. Mass 12 is supported away from direct contact with casing 1 by spacers 13 of heat insulation material. This mass of material in chamber 2 is preferably a fine wire mesh having a high surface area per unit volume and containing a large amount of enriched uranium. This wire mesh 12 is preferably constructed of highly enriched uranium (such as 85% enriched uranium) alloyed with zirconium for structural strength. Enriched uranium is uranium having a higher percentage of the U-235 nuclide than is normally found in natural uranium. It is to be noted that the smaller the diameter of wire, the higher the area to volume ratio. Therefore, in order to obtain as rapidly as possible a heat transfer from the wire to the gas in chamber 2, a very fine wire mesh of a uranium-zirconium alloy is used.

Plates 14 and 15, constructed of an electrical conducting material, are supported by insulated supports 16 and 17, respectively, on each side of diaphragm 4. When diaphragm 4 is in a balanced condition, i. e., when the gas pressures in chambers 2 and 3 are identical, the capacitance between plate 14 and diaphragm 4 is identical to the capacitance between plate 15 and diaphragm 4. A deflection of diaphragm 4 due to a pressure differential upsets this equilibrium by increasing one capacitance while decreasing the other. Wires 18, 19 and 20 are electrically attached to diaphragm 4, plate 14 and plate 15, respectively. Wires 18, 19 and 20 which are electrically insulated from each other, are conveyed through conduit 21 to an external bridge detector (to be described later). Hermetic seal 22 is provided in conduit 21 to prevent leakage of the gas from chamber 3. Hermetic seal 23 prevents leakage of the gases between the chambers at the point where wire 19 passes through support 5. The bridge detector produces an output voltage at one of two terminals, depending on the direction of movement of diaphragm 4. The magnitude of the output voltage is a measure of the magnitude of the movement of diaphragm 4.

Neutron shutter 11 is designed to expose mass 12 to the full force of the neutron flux when the shutter is in the open position as shown in Fig. 1. Energization of solenoid coil 24 from an external source of potential (not shown) closes shutter 11 by moving it to the left in Fig. 1 due to the attractive force of the magnetic field of coil 24 on ferromagnetic solenoid plunger 25. This leftward movement compresses return spring 27. When shutter 11 is completely closed, a thin sheet of cadmium is interposed between the source of neutron flux and mass 12. Cadmium has well-known neutron absorbing characteristics, particularly for thermal neutrons. A cadmium layer having a thickness of .015" is essentially "black" to thermal neutrons, that is, over 99% of the thermal neutrons entering the cadmium layer are absorbed by the cadmium atoms. It is to be noted that graphite layer 10 extends over cadmium layer 26 and thereby effectively thermalizes most of the neutrons before they strike cadmium layer 26. With solenoid coil 24 energized, both chambers 2 and 3 are substantially completely shielded from incident neutrons and therefore the gases in the chambers are permitted to reach a state of equilibrium in both temperature and pressure. The temperature of the gases in this state of equilibrium is the ambient temperature of the facilities around the detractor. The gas pressure at this temperature is preferably near atmospheric pressure. Upon de-energization of coil 24, spring 27 moves shutter 11 to the right thereby exposing mass 12 to the full force of the neutron flux. It is to be noted that neutrons are not permitted to leak into chamber 2 through cap 28 since cap 28 is also provided with cadmium layer 29 covered by graphite layer 30.

In operation, assume shutter 11 is open, as shown. Neutrons from the source thereof (such as the water boiler reactor of Fig. 3) are permitted to freely move through wall 9 into chamber 2. Most of these neutrons are thermalized by graphite layer 10. Under the laws of probability for any given neutron flux, there is a fixed probability of the occurrence of a fission reaction per atom of U-235 in mass 12. In computing this probability the fission cross-section, $\sigma_f$, of the U-235 atoms is utilized. This fission cross-section is defined as the probability of the occurrence of a nuclear fission per atom per incident neutron per square centimeter. The methods of calculating the rate of fission reactions for any given neutron flux and any given composition of mass 12 are well-known and need not be further described here. This fission rate may readily be obtained for a given mass of fissionable material in a detector constructed according to this invention by subjecting the detector to a known neutron flux with plunger 7 completely closed and reading the output from the detector. For any given rate of fission, there is a fixed amount of heat generated in mass 12, which is rapidly conducted to the gas in chamber 2. As a result of this additional heat furnished to the gas in chamber 2, the temperature of the gas rises above the ambient temperature. This rise in temperature of the gas may be measured by any conventional thermometer to provide thereby an indication of the magnitude of the neutron flux.

The particular embodiment shown in Fig. 1 is further sensitive to changes in the neutron flux. For example, assume a condition of equilibrium has been reached by the apparatus for a given neutron flux. Under this condition, the rate of heat generation in wire mesh 12 is exactly equal to the rate of heat dissipation through the walls of casing 1. The pressures in chambers 2 and 3 are equal due to a previous interflow of the gases through orifice 6. The bridge detector does not generate any output voltage since capacitive pickoff 31 is in a balanced condition. If now the magnitude of the neutron flux entering chamber 2 increases or decreases, the fission rate and the amount of heat generated in wire mesh 12 increases or decreases a corresponding amount. For purposes of illustration, assume an increase in the neutron flux. This results in a rise in temperature of the gas in chamber 2 without any corresponding increased temperature of the gas in chamber 3. The gas in chamber 2 therefore undergoes a substantially constant volume change of state in accordance with the formula, $$p_2/p_1 = T_2/T_1$$

in which $T_1$ is the absolute temperature of the gas before the temperature change and $T_2$ is the absolute temperature of the gas after the temperature change, while $p_1$ and $p_2$ are, respectively, the gas pressures before and after the temperature change. Thus, the pressure of the gas in chamber 2 increases. Plunger 7 in orifice 6 prevents the rapid flow of gas from chamber 2 to chamber 3 as a result of this increased gas pressure in chamber 2. Diaphragm 4 moves to the right in Fig. 1 as a result of the change in relative pressures thereby unbalancing capacitive pickoff 31.

Figure 2:
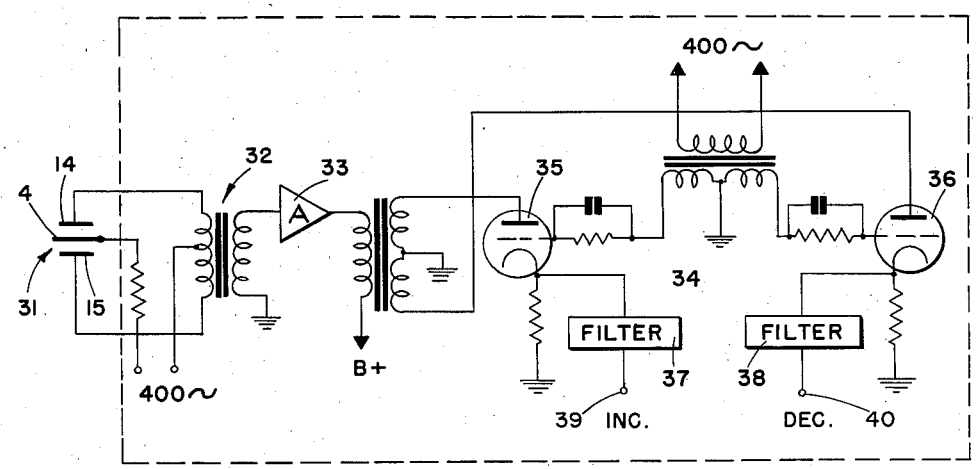
Fig. 2 is a schematic drawing of an electronic circuit utilized in the neutron detector of Fig. 1 for producing a signal which is a predetermined function of the rate of change of the neutron flux incident upon the sensitive element of the detector.

Referring now to Fig. 2, a schematic drawing of a typical bridge detector utilized with the apparatus of Fig. 1 for producing an electric signal output which is a function of the displacement of diaphragm 4 is shown. The primary winding of transformer 32 is center tapped. The end terminals of the primary winding are connected to plates 14 and 15 of capacitive pickoff 31. A 400 cycle voltage from a source (not shown) is impressed between the center-tap and plate 14 of capacitive pickoff 31. Thus, capacitive pickoff 31, transformer 32 and the 400 cycle source constitute a normally balanced bridge network. As long as the capacitive pickoff is balanced, no signal is induced in the secondary winding of transformer 32. An unbalancing of pickoff 31 unbalances the bridge network and results in a voltage being induced in this secondary winding. The phase of this induced voltage is dependent upon the direction of movement of diaphragm 4. The magnitude of the voltage is determined by the magnitude of the movement of diaphragm 4. This voltage is amplified by amplifier 33. The amplified signal is coupled into phase detector 34 where its phase is compared to a 400 cycle signal from the same source that energizes the bridge network. Either tube 35 or 36 is caused to conduct, depending on the phase of the input signal. A pulsed signal is generated across one of the cathode resistors of tubes 35 or 36. This signal is filtered by filters 37 or 38. As a result, a D.-C. potential is impressed on either terminal 39 or terminal 40, depending on whether the magnitude of the neutron flux in chamber 2 is increased or decreased, respectively.

Referring again to Fig. 1, the neutron detector contemplated by this invention can be utilized to produce an indication of the absolute neutron flux in either one of two ways. First, if screw 8 is turned to cause plunger 7 to completely close orifice 6, pickoff 31, being responsive to the pressure in chamber 2 which in turn is a function of the temperature of the gas, is essentially a thermometer measuring the heat generated as a result of the absorption of the neutrons by the U–235 atoms. Second, by operating the detector and shutter in the following steps: first, energizing solenoid coil 24 to thereby insert cadmium layer 26 of neutron shutter 11 between the detector and the source of the neutrons; second, allowing the detector to reach a state of equilibrium as indicated by zero output voltages at terminals 39 and 40; and third, rapidly removing the shutter by de-energizing solenoid coil 24. The full impact of the neutron flux is thereupon suddenly impressed on chamber 2. The rate of change of neutron flux indicated by the bridge detector is therefore a predetermined function of the absolute neutron density.

Other good neutron absorbing materials can be substituted for the fissionable U–235 in wire mesh 12. Thus, for example, the plutonium nuclide having an atomic weight of 239 can be utilized with equal effectiveness. Such nonfissionable materials, which have a good neutron absorbing cross-section, as lithium, boron or cadmium, can be substituted for the U–235 in the example, although the magnitude of heat generated per neutron absorbed is much less than if a fissionable material is used.

The sensitivity of the neutron detector to rates of change of neutron flux is controlled by adjusting the size of orifice 6 by varying the axial position of plunger 7. This is accomplished by utilizing screw 8. The smaller the size of orifice 6, the longer it will take for the pressures in chambers 2 and 3 to reach equilibrium. For this reason a small increase in the neutron flux builds up a greater pressure in chamber 2 when orifice 7 is very small than when orifice 7 is comparatively large.

Referring now to Fig. 3, a typical use of the neutron detector contemplated by this invention is shown. For clarity, only core 41 of the liquid homogeneous or water boiler reactor is shown. The reactor itself may be constructed similar to that described in AECD–3063 entitled "Water Boiler," by C. P. Baker et al., published September 4, 1944, and available from the Technical Information Service, Oak Ridge, Tennessee. This reactor has central exposure facility 42 into which neutron detector 43 is placed. In this position the neutron detector is made sensitive to the neutron flux in the core and can either indicate the absolute value of the neutron flux or the rate of change of the neutron flux, as above-described.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A neutron detector comprising a sealed chamber for exposure to incident neutrons, a gas in said chamber, a mass of a substance having a good neutron absorption cross-section positioned in said sealed chamber, and means responsive to the temperature of said gas in said sealed chamber for producing a signal.

2. A neutron detector as recited in claim 1 in which said substance having a good neutron absorption cross-section is a fissionable material.

3. A neutron detector as recited in claim 1 in which said mass in said sealed chamber contains enriched uranium and has a high surface area-to-volume ratio.

4. A neutron detector sensitive to rate of change of a neutron flux from a source thereof comprising a sealed chamber for exposure to said neutron flux, a restricting orifice connected to said chamber, a mass of a substance having a good neutron absorption cross-section positioned in said chamber, and pressure sensitive means positioned to detect changes of gas pressure in said chamber whereby changes in the magnitude of said neutron flux changes the gas pressure in said chamber actuating said pressure sensitive means.

5. A neutron detector as recited in claim 4 and further comprising a neutron shutter interposed between said chamber and said source of neutrons.

6. A neutron-sensitive apparatus comprising a pair of gas-filled sealed chambers; a restrictive orifice interconnecting said pair of chambers; pressure sensitive means responsive to the pressure differential between said sealed chambers; and a mass of fissionable material positioned in one of said chambers whereby variations in the neutron flux incident upon said mass of fissionable material actuate said pressure sensitive means.

7. A neutron detector sensitive to rapid fluctuations in the magnitude of incident neutron flux from a source thereof comprising a gas-filled sealed chamber subjected to said incident neutron flux; a second gas-filled sealed chamber, said first and second chambers being subjected to substantially the same ambient temperature; a duct interconnecting said two chambers; a restrictive orifice in said duct; a flexible diaphragm between said chambers, said diaphragm being positioned to move in response to the pressure differential between said chambers; a capacitive pickoff sensitive to the movements of said diaphragm; and a mass of fine wire mesh containing enriched uranium positioned in said first gas-filled chamber whereby said capacitive pickoff is actuated whenever said first gas-filled chamber is subjected to a rapid variation in the magnitude of incident neutron flux.

8. A detector as recited in claim 7 and further comprising a neutron shutter interposed between said first gas-filled chamber and said source of neutrons, said shutter including means for thermalizing and absorbing said impinging neutrons whereby immediately after removing said shutter said capacitive pickoff indicates the absolute value of said neutron flux.

References Cited in the file of this patent
UNITED STATES PATENTS
2,491,220    Segre et al. _____ Dec. 13, 1949